United States Patent
Adolph et al.

(10) Patent No.: US 6,754,586 B1
(45) Date of Patent: Jun. 22, 2004

(54) APPARATUS AND METHODS FOR MONITORING OUTPUT FROM PULSED NEUTRON SOURCES

(75) Inventors: Robert A. Adolph, Houston, TX (US); Loïc Vildé, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 20 days.

(21) Appl. No.: 10/249,297

(22) Filed: Mar. 28, 2003

(51) Int. Cl.[7] .............................................. G01V 5/101
(52) U.S. Cl. ......................................................... 702/8
(58) Field of Search ............................. 702/8; 250/269.4, 250/269.5, 269.6, 269.8, 269.2

(56) References Cited

U.S. PATENT DOCUMENTS

| | | | |
|---|---|---|---|
| 4,151,413 A | * | 4/1979 | Arnold .................... 250/269.8 |
| 4,647,781 A | | 3/1987 | Takagi et al. |
| 4,697,078 A | * | 9/1987 | Randall ...................... 250/256 |
| 4,760,252 A | | 7/1988 | Albats et al. |
| 4,814,610 A | * | 3/1989 | Attali et al. ............. 250/269.2 |
| 4,833,956 A | | 5/1989 | Roberts |
| 4,926,044 A | | 5/1990 | Wraight |
| 4,972,082 A | | 11/1990 | Loomis et al. |
| 5,235,185 A | | 8/1993 | Albats et al. |
| 5,804,820 A | * | 9/1998 | Evans et al. ............. 250/269.6 |
| RE36,012 E | | 12/1998 | Loomis et al. |
| 5,900,627 A | * | 5/1999 | Odom et al. ............. 250/269.7 |
| 6,032,102 A | | 2/2000 | Wijeyesekera et al. |

\* cited by examiner

*Primary Examiner*—Donald McElheny, Jr.
(74) *Attorney, Agent, or Firm*—Victor H. Segura; Brigitte L. Jeffery; John Ryberg (57) ABSTRACT

Techniques for monitoring a pulsed neutron source include measuring a burst count rate while the pulsed neutron source is turned on using a monitor detector disposed proximate the pulsed neutron source; measuring a decay count rate while the neutron source is turned off using the monitor detector; and deriving a source strength indicator from the burst count rate and the decay count rate. A pulsed neutron tool includes a tool body; a pulsed neutron source disposed in the tool body; a monitor detector disposed in the tool body proximate the pulsed neutron source; at least one measurement detector disposed in the tool body at a predetermined distance from the pulsed neutron source; and circuitry disposed in the tool body for controlling the pulsed neutron source, the monitor detector, and the at least one measurement detector.

18 Claims, 5 Drawing Sheets

APPARATUS AND METHODS FOR MONITORING OUTPUT FROM PULSED NEUTRON SOURCES

BACKGROUND OF INVENTION

The invention relates generally to pulsed neutron instruments. More specifically, the present invention relates to monitoring source strength of a pulsed neutron source.

Determining the porosity and fluid content of subsurface earth formations are critical elements in maximizing the efficiency of oil, gas, and water ("formation fluids") exploration. To that end, a variety of techniques have been developed. One of the well known techniques involves irradiating the subsurface earth formations with high-energy neutrons and monitoring the resulting energy spectra. When neutrons bombard the formations surrounding the wellbore, they induce a radioactive response, generally in the form of neutrons and gamma radiation, which may be recorded by one or more detectors. Depending on the application, either or both types of radiation may be monitored. By using such techniques, it is possible to determine the porosity and fluid content of a given formation, which generally correspond to the amounts of various fluids that may be easily retrieved from a formation.

For neutron logging, the source used can be chemical or electrical in nature depending on the requirements of the application. The chemical neutron source has the advantage of being virtually indestructible. It has no electronic parts, so it can be relied upon to always produce neutrons (zero downtime). However, this is also a disadvantage of the chemical source. Because the emission of neutrons cannot be shut off, strict radioactive safety procedures must be followed. This inconvenience prompted the development of electronic neutron sources.

The advantage of an electronic neutron source (e.g., a Minitron™ available from Schlumberger Technology Corporation (Sugar Land, Tex.)) is that it can be shut off, bringing the neutron emission levels to zero. This is both beneficial on the surface, where people are present, and downhole, in the event that the tool gets stuck and has to be abandoned. A Minitron™ typically emits eight times as many neutrons with three times as much energy compared to a conventional chemical logging source. A Minitron™ typically includes a ceramic tube containing tritium and deuterium at low pressure. This device creates neutrons at an energy of 14 MeV by accelerating deuterium ions into a tritium target. Such a system is often found in a pulsed neutron generator (PNG). When using such a pulsed neutron generator, the formation surrounding the well logging instrument is subjected to repeated, discrete "bursts" of neutrons. Being able to control the timing of bursts provides a pulsed neutron generator or an electronic neutron source a big advantage: more measurements are possible with an electronic neutron source than with a chemical neutron source because of the added time dimension.

Neutrons have no electric charge and their mass is similar to that of a proton. The lack of charge allows neutrons to penetrate into formations. This property of neutrons makes it ideal for logging applications. In the formation, neutrons interact with matter in a wide variety of ways. The characteristics of some of these interactions can be used to measure the formation properties.

Instruments that can make measurements for deriving various formation properties are described, for example, in U.S. Pat. No. 6,032,102 issued to Wijeyesekera et al., and in U.S. Pat. No. Re. 36,012 issued to Loomis et al., both assigned to the present assignee. Generally speaking, the instruments disclosed in these patents are arranged so that a pulsed neutron source therein emits a plurality of short duration neutron bursts. These bursts have a sufficient duration so as to enable relatively accurate measurement of density (through spectral analysis of inelastic gamma rays) and accurate measurement of porosity (through measurement of neutron count rates). A neutron detector positioned appropriately with respect to the source is used on such instruments to make the neutron count rate measurements. A gamma ray detector positioned appropriately with respect to the source, and coupled to a spectral analyzer, is used to make the inelastic gamma ray measurements. The short duration bursts are repeated for a selected number of times and the measurements made in appropriate time windows during and/or after each neutron burst are summed or stacked to improve the statistical precision of the measurements made therefrom. These instruments may also be adapted to measure neutron capture cross section of the earth formations.

In operating these neutron tools, it is often important to know the absolute strength of the nuclear source in order to calibrate the response of nuclear detectors. Pulsed neutron sources are used because of their enhanced safety compared to chemical sources and their ability to stimulate timing measurements. However, the output of a pulsed neutron source is prone to unpredictable and/or non-statistical changes over time. Therefore, it is desirable to have methods for monitoring the pulsed neutron source strength.

In principle, pulsed neutron source strength may be monitored by a detector having a high energy threshold such that it only detects high energy neutrons that have not interacted with the environment. Unfortunately, the count rates from such a detector are often too low to provide statistically reliable results under typical logging conditions. In addition, the stability of the high energy threshold may vary between different tools/detectors and over different temperatures. As a result, such count rates may not provide an accurate indication of the source strength under typical logging conditions. Thus, it is desirable to have better techniques for monitoring pulsed neutron source strength that can be used under typical logging conditions.

SUMMARY OF INVENTION

The invention provides a method for monitoring a pulsed neutron source. The method includes measuring a burst count rate while the pulsed neutron source is emitting neutrons using a monitor detector disposed proximate the pulsed neutron source; measuring a decay count rate while the pulsed neutron source is not emitting neutrons using the monitor detector; and deriving a source strength indicator by using the burst count rate and the decay count rate according to a selected function to substantially remove environmental effects in the burst count rate.

The invention provides a method for obtaining source strength-compensated measurements using a pulsed neutron tool equipped with a pulsed neutron source. The method includes measuring a burst count rate while the pulsed neutron source is emitting neutrons using a monitor detector disposed proximate the pulsed neutron source; measuring a decay count rate while the pulsed neutron source is not emitting neutrons using the monitor detector; deriving a source strength indicator from the burst count rate and the decay count rate; and using the source strength indicator to compensate measurements made by other detectors in the pulsed neutron tool for strength variations of the pulsed neutron source.

The invention provides a method for obtaining source strength-compensated measurements using a pulsed neutron tool equipped with a pulsed neutron source. The method comprises obtaining a first source strength indicator using a monitor detector disposed proximate the pulsed neutron source under controlled conditions; obtaining a second source strength indicator using the monitor detector under experimental conditions; obtaining an experimental count rate using a measurement detector under the experimental conditions; and compensating the experimental count rate for neutron source strength variation based on the first source strength indicator and the second source strength indicator.

The invention provides a pulsed neutron tool, including a tool body; a pulsed neutron source disposed in the tool body; a monitor detector disposed in the tool body proximate the pulsed neutron source; at least one measurement detector disposed in the tool body at a predetermined distance from the pulsed neutron source; and circuitry disposed in the tool body for controlling the pulsed neutron source, the monitor detector, and the at least one measurement detector.

Other aspects of the invention will become apparent from the following description, the drawings, and the claims.

DETAILED DESCRIPTION

Embodiments of the present invention relate to apparatus and methods for monitoring source strengths of pulsed neutron sources. An apparatus in accordance with the invention uses a monitor detector (e.g., a $^3$He detector) to monitor the output of a pulsed neutron generator. Methods in accordance with the invention take advantage of the pulsed nature of the source to measure the count rates both during the time the source is turned on and after the source is turned off. The monitor count rates thus obtained are first corrected for environmental effects, if necessary, and then used to compensate measurements of other detectors for source strength variations.

Figure 1:
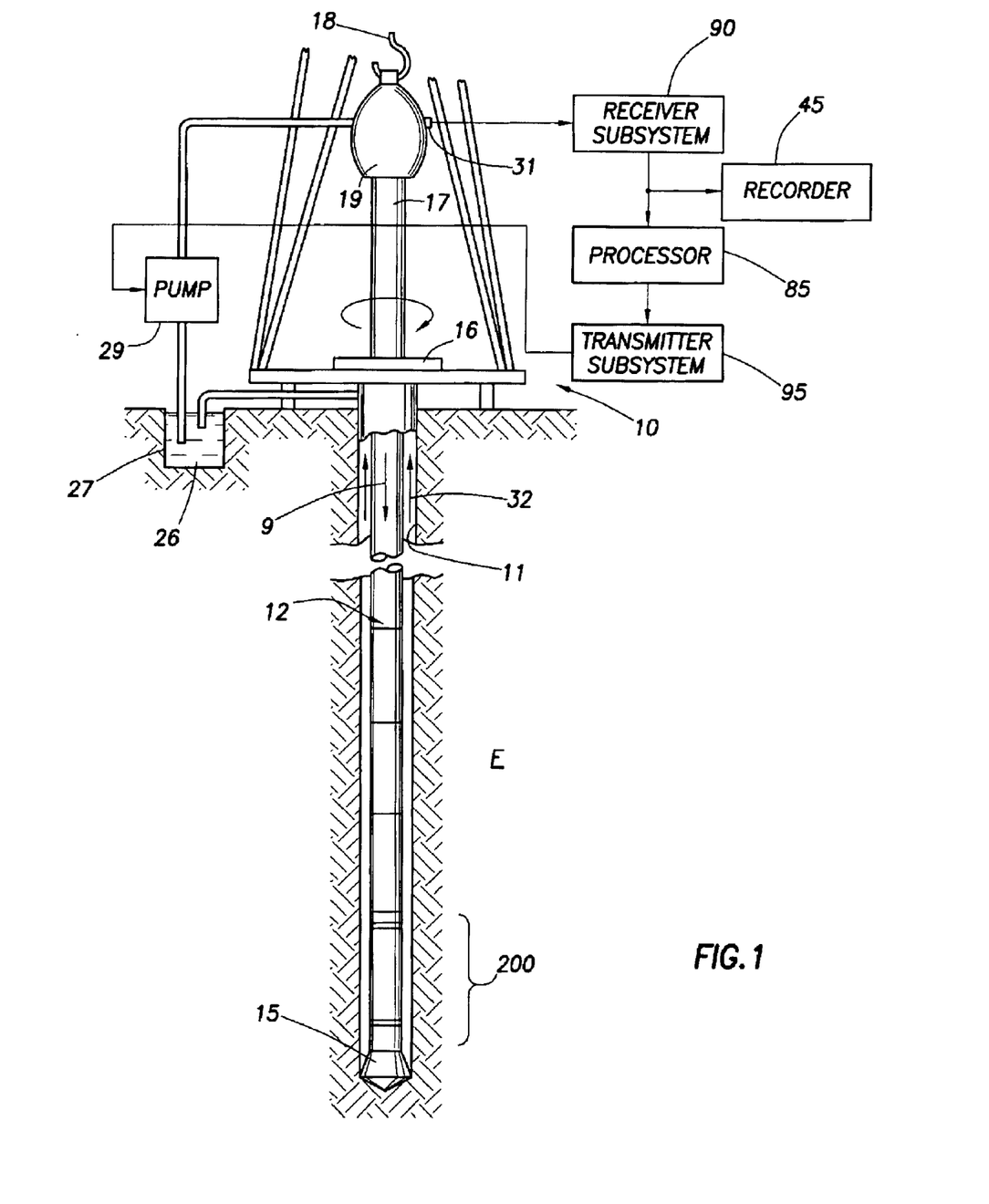
FIG. 1 shows a drilling system for drilling a wellbore in an earth formation in accord with an embodiment of the invention.

FIG. 1 illustrates a drilling rig and drill string in which the present invention can be implemented. As shown in FIG. 1, a platform and derrick assembly 10 are positioned over wellbore 11 penetrating subsurface formation F. A drill string 12 is suspended within wellbore 11 and includes drill bit 15 at its lower end. Drill string 12 is rotated by rotary table 16, energized by means not shown, which engages kelly 17 at the upper end of the drill string. Drill string 12 is suspended from hook 18, attached to a traveling block (not shown), through kelly 17 and rotary swivel 19 which permits rotation of the drill string relative to the hook.

Drilling fluid or mud 26 is stored in pit 27 formed at the well site. Pump 29 delivers drilling fluid 26 to the interior of drill string 12 via a port in swivel 19, inducing the drilling fluid to flow downwardly through drill string 12 as indicated by directional arrow 9. The drilling fluid exits drill string 12 via ports in drill bit 15, and then circulates upwardly through the region between the outside of the drillstring and the wall of the wellbore, called the annulus, as indicated by direction arrows 32. In this manner, the drilling fluid lubricates drill bit 15 and carries formation cuttings up to the surface as it is returned to pit 27 for recirculation.

Drillstring 12 further includes a bottom hole assembly (BHA) 200 disposed near the drill bit 15. BHA 200 may include capabilities for measuring, processing, and storing information, as well as communicating with the surface (e.g., MWD/LWD tools). The measurement tools included in BHA 200 may include nuclear (neutron or gamma ray), acoustic, or resistivity logging instruments.

The BHA 200 also includes a telemetry subassembly (not shown) for data and control communication with the earth's surface. Such apparatus may be of any suitable type, e.g., a mud pulse (pressure or acoustic) telemetry system as disclosed in U.S. Pat. No. 5,235,285, which receives output signals from the data measuring sensors and transmits encoded signals representative of such outputs to the surface where the signals are detected, decoded in a receiver subsystem 90 and applied to a processor 85 and/or a recorder 45. The processor 85 may comprise any suitably programmed digital or analog computer, and the recorder 45 preferably comprises a conventional recorder-plotter for making the usual visual and/or magnetic data record as a function of borehole depth. A surface transmitter subsystem 95 may also be provided for establishing downward communication with the BHA 200, as disclosed, for example, in the aforementioned U.S. Pat. No. 5,235,285.

The BHA 200 also includes conventional acquisition and processing electronics (not shown) comprising a microprocessor system (with associated memory, clock and timing circuitry, and interface circuitry) capable of timing the operation of the tool source(s) and the data measuring sensors, storing data from the measuring sensors, processing the data and storing the results, and coupling any desired portion of the data to the telemetry components for transmission to the surface. Alternatively, the data may be stored downhole and retrieved at the surface upon removal of the tool. Suitable downhole circuitry for these purposes is described in U.S. Pat. No. 4,972,082 and U.S. Pat. No. 5,051,581. Power for the downhole electronics may be provided by means known in the art, including by battery or by a downhole turbine generator powered by the drilling fluid.

Figure 2:
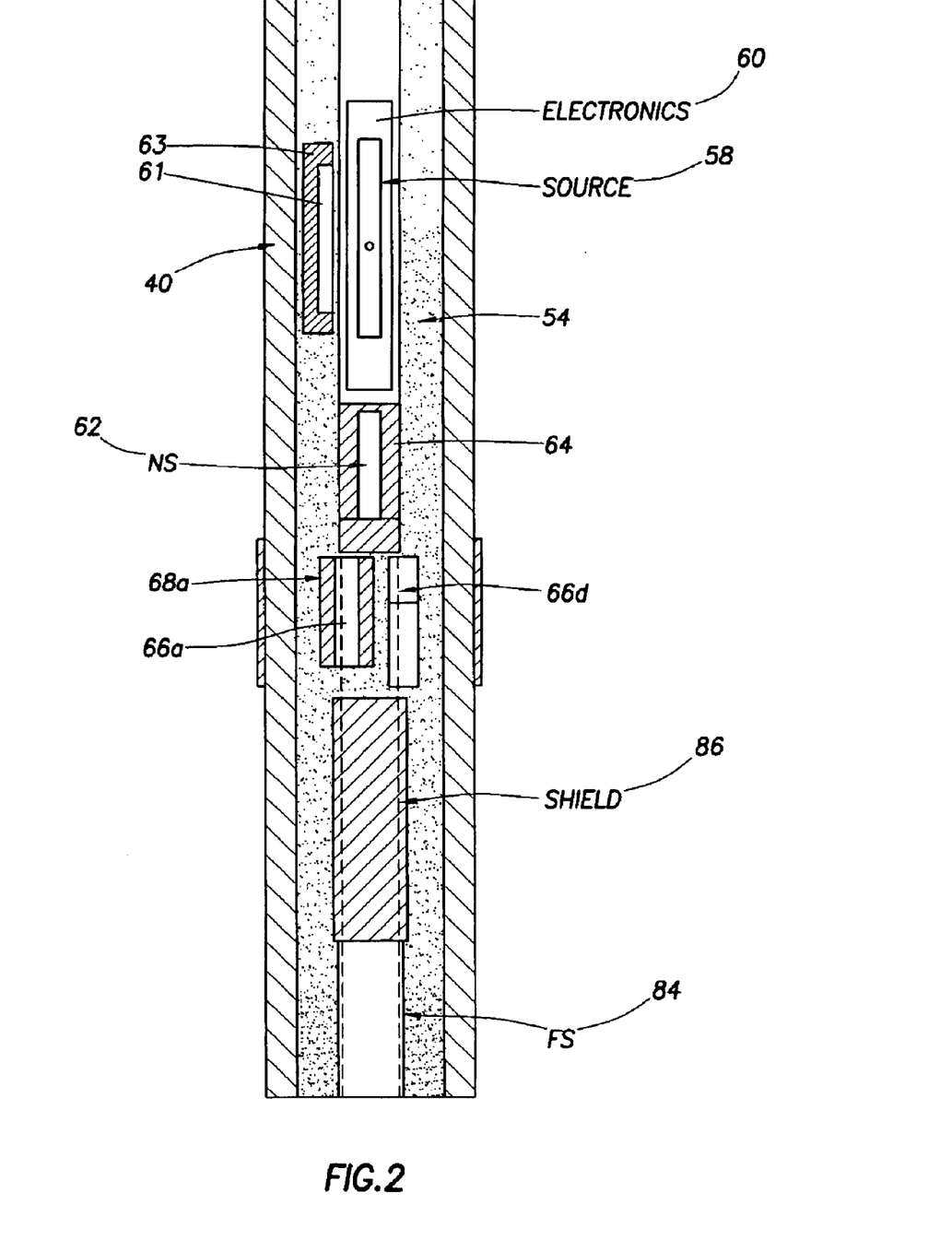
FIG. 2 shows a neutron logging tool in accordance with one embodiment of the invention.

FIG. 2 shows a neutron tool in accordance with embodiments of the invention. As shown in FIG. 2, a collar (40) surrounds a tool body or chassis (54). In the chassis (54) are a neutron source/accelerator (58) and its associated control and high voltage electronics package (60). A radiation detector (61) ("monitor detector") is disposed proximate to the neutron source (58). The neutron source (58) is a pulsed neutron source, preferably a D-T type (14 MeV) source known in the art. The high voltage electronics package (60) controls the pulsing of the neutron source (58).

The radiation detector (61), which is referred to as a "monitor detector," is primarily for monitoring the output of the neutron source (58). Methods for such monitoring will be described below. The monitor detector (61) may be a conventional $^3$He detector, a $^4$He detector, or any other detector (e.g., a photon detector) known in the art for detecting neutrons (including high energy neutrons, epithermal neutrons, or thermal neutrons) or gamma rays. To enhance the selectivity of the monitor detector (61) to the neutron source (58), the monitor detector (61) may be shielded with a proper material (63) on all sides except for the side facing the neutron source (58). The shielding (63) for the monitor detector (61) may comprise any suitable material known in the art. For example, for a $^3$He detector, a material capable of absorbing high and low energy neutrons, e.g., a combined neutron moderating-neutron absorbing material, such as boron carbide (or other 1/v type absorber) distributed in an epoxy (or other hydrogenous material) binder may be used. Information concerning the structure and function of the shielding for such a detector may be found, for example, in U.S. Pat. No. 4,760,252, issued to Albats et al. and assigned to the present assignee. For a higher energy (MeV) neutron detector, e.g., a $^4$He detector, the shielding material is preferably a high-Z material such as disclosed in U.S. Pat. No. RE 36,012 issued to Loomis et al. and assigned to the present assignee.

As shown in FIG. 2, a neutron logging tool in accordance with the invention also includes conventional detectors such as a near-spaced detector (62), a far-spaced detector (84), and an array of neutron and/or gamma ray detectors (66a) and (66d). The near-spaced detector (62) is to detect signals primarily proportional to the neutron flux from the accelerator with minimum influence from the formation. To that end, the detector (62) typically comprise an epithermal neutron detector, e.g., a $^3$He proportional counter, which is located close to the accelerator without intervening high density shielding. Furthermore, the detector (62) may be clad in cadmium or other material having high thermal neutron capture cross section to raise its detection threshold to epithermal levels. The detector (62) may also be surrounded, preferably on all sides except that adjacent to the accelerator (58), by a shield (64) made of a combined neutron moderating-neutron absorbing material, such as boron or boron-loaded materials. Alternatively, the near detector (62) may be other higher energy (MeV) neutron detector, e.g., a $^4$He detector, surrounded by a high-Z material as disclosed in U.S. Pat. No. RE 36,012 issued to Loomis et al.

Although two detectors (66a), (66d) are shown in FIG. 2, the array of detectors may comprise any number of detectors. Further, while (66a) and (66d) are shown at the same longitudinal spacing from the neutron source (58), they need not be. One or more additional detectors may be provided at different longitudinal spacings. Further details concerning the configuration of the individual detectors and their shielding, are described in more detail in U.S. Pat. Nos. 4,760,252 and 4,972,082. The detectors in the array may be epithermal neutron detectors, thermal neutron detectors, and/or gamma ray detectors. The functions of these detectors in formation logging are well known in the art.

For example, epithermal neutron detectors measure the epithermal neutron flux in the formation, typically at a spacing close to the neutron source to minimize the effect of the heavier formation elements (e.g., oxygen, silicon, carbon, calcium, etc.), which dominate bulk density, and to maximize the influence of formation hydrogen on the detector outputs. When properly configured, a typical epithermal neutron detector response will depend primarily on the hydrogen index with only a residual lithology effect. For example, to enhance sensitivity to the formation, the epithermal detectors, which may be $^3$He proportional counters, are preferably located adjacent the drill collar wall and back-shielded, as shown at (68a), to reduce borehole neutron sensitivity. The shielding material, for example, may be cadmium, boron or boron-loaded materials.

A thermal neutron detector may likewise be a $^3$He proportional counter shielded similarly to the epithermal detectors, except that the cadmium cladding is omitted on the formation side to render the detector sensitive to formation thermal neutrons. A gamma ray detector may comprise any suitable type detector, such as NaI, BGO, CsI, anthracene, etc., but preferably is a cerium-activated gadolinium orthosilicate (GSO) detector as disclosed in U.S. Pat. Nos. 4,647,781 and 4,883,956.

As shown in FIG. 2, a neutron tool in accordance with the present invention may also include one or more far-spaced detectors, shown as (84), located downstream of the array detectors (66a), (66d) with an intervening neutron shield (86). In accordance with the invention, the far-spaced detector (84) may be positioned relative to the neutron source (58) so as to be sensitive to MeV energy neutrons (or, preferably, MeV neutron-induced gamma rays) that penetrate to relatively far distances in the formation. The far-spaced detector (84) may be either a gamma ray detector or an MeV neutron detector.

Although not specifically shown, appropriate timing and control circuitry is also provided to operate the neutron source (58) in a pulsed mode and to gate the detectors as needed selectively to detect inelastic and/or capture gamma rays. In addition, it would be understood that the above-described detectors include all amplification, pulse shaping, power supply and other circuitry required to generate output signals representative of the radiation detected. Such circuitry is well known in the art.

Some embodiments of the invention relate to methods of using a monitor detector (e.g., a $^3$He detector) to monitor the output of a pulsed neutron generator. Methods of the invention may further include correcting the monitor detector count rates for environmental effects (mainly lithology, porosity and standoff), yielding a compensated (corrected) monitor of source strength. The corrected source monitor can then be used to compensate other detector measurements for source strength variations that arise from, for example, imperfections in the pulse neutron generator, power fluctuations, etc. The resulting source-compensated measurements can then provide an improved accuracy in formation logging.

Figure 3:
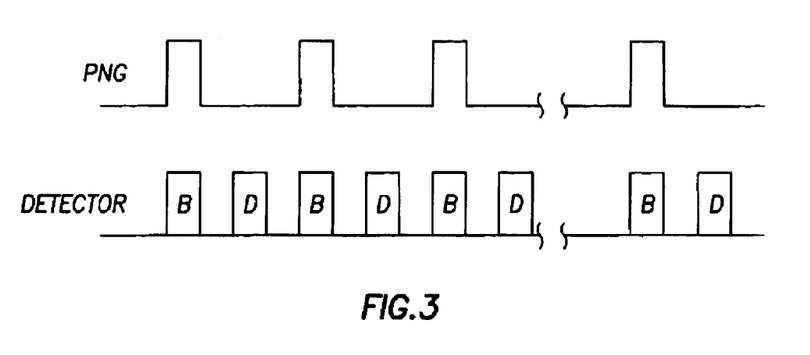
FIG. 3 shows a burst timing scheme and neutron measurements according to one embodiment of the invention.

As shown in FIG. 3, a pulsed neutron generator is typically operated according to a timing scheme that includes a train of short bursts of neutrons with each burst followed by a duration when the PNG is turned off. For example, U.S. patent application Ser. No. 09/929,680 by Adolph discloses several burst timing schemes for formation loggings using a neutron tool. The duration when the PNG is on is referred to as a "burst" period (shown as B), while the duration when the PNG is off is referred to as "decay" period (shown as D).

Figure 4:
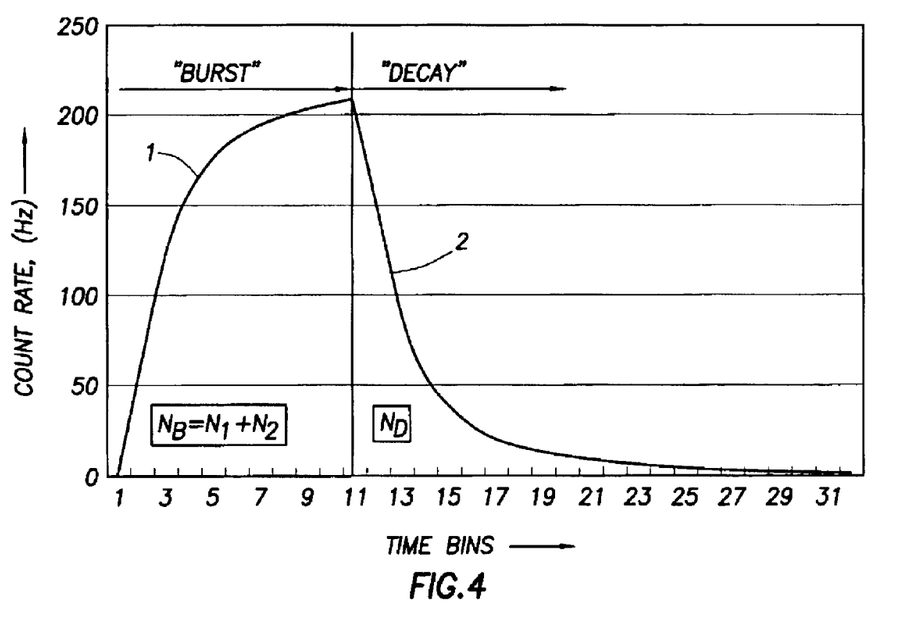
FIG. 4 shows a schematic of neutron signals detected during the burst and decay periods.

FIG. 4 shows a schematic of signals measured by a detector during the burst period and the decay period. Curve 1 shows that when the pulsed neutron source is turned on, there is a rapid rise of count rates. These counts are typically collected into several time bins, as shown in FIG. 4. Curve 2 shows a rapid decay in count rates once the neutron source is turned off. Again, these counts may be stored in several time bins in a typical measurement.

In accordance with embodiments of the invention, count rates are detected by a monitor detector during the burst period B ($N_B$) and during the decay period D ($N_D$). In general, count rates ($N_B$) detected during period B are contributed by two types of neutrons: source neutrons which have not undergone any nuclear interactions with the environment and neutrons which have interacted (collided) with the environment one or more times and bounced back to the detector. If $N_1$ represents the count rates contributed by the source neutrons and $N_2$ represents the count rates contributed by the collided neutrons, then $N_B = N_1 + N_2$ (see FIG. 4).

In contrast, count rates ($N_D$) detected during the decay period D include only neutrons that have collided with the environment and bounced back to the detector. The count rates ($N_D$) detected during the decay period D do not include any counts directly from the neutron source because no neutrons are generated during this time period. Note that while $N_D$ and $N_2$ both represent count rates arising from neutrons that have interacted with the formation, these two count rates are not necessarily identical because they represent measurements at different time periods. Nevertheless, a relationship exists between count rates $N_D$ and $N_2$ because both are influenced by the same environmental factors. Experiments have shown that $N_D$ may be used to estimate the contribution of $N_2$ to $N_B$. Therefore, it should be possible to derive $N_1$ from $N_B$ and $N_D$. $N_1$ thus derived is directly related to the source strength.

According to one embodiment of the invention, $N_B$ and $N_D$ are mathematically combined to provide an indicator of the source strength (S), which is an analog of $N_1$ that has been effectively compensated for environmental effects. The exact functional form of the relationship between the source strength indicator (S), $N_B$, and $N_D$ may depend on, for example, the types of radiation involved (neutron, gamma, . . . ), the configuration of the tool, and measurement media. The functional form of the relationship can be determined analytically through modeling and/or empirically.

For example, the burst count rates $N_B$ and decay count rates $N_D$ may be used to determine a correction for $N_B$ and to derive a source strength monitor S in the following format:

$$S = \alpha(N_B - \beta(N_B, N_D) \times N_D) \quad (1)$$

where $N_B$ represents count rates during the burst, $N_D$ represents count rates during the decay phase, a is a normalizing factor, $\beta (N_B, N_D)$ is a proportional factor between the decay count rate ($N_D$) and the contributions of the environment-affected neutrons in the burst count rates ($N_B$). One skilled in the art would appreciate that the count rates $N_B$ and $N_D$ preferably are of sufficient magnitudes such that they are statistically suitable for source strength monitoring. This generally means that the statistical uncertainty of the count rates should be below a desired level, e.g., 1%. The count rates $N_B$ and $N_D$ may be used as is. Alternatively, the count rates $N_B$ and $N_D$ may be corrected for environmental effects before use, using information from other detectors. For example, a porosity measuring neutron detector (or other detector) may be used to provide a first-order environmental correction to the count rates of the monitor detector (i.e., $N_B$ and $N_D$).

The factors $\alpha$ and $\beta$ ($N_B, N_D$) may be computed from measurements made in a controlled environment using a neutron source having a known strength, i.e., the neutron source strength is independently verified. Several methods are known in the art that may be used to independently verify the neutron source strength for this purpose.

For example, accurate measurements of the neutron source strength may be provide by neutron monitor "Knock-On" counts, which are acquired with a monitor having a high energy threshold to exclude neutrons that have interacted with the environment (hence lost energy). To be reliable, these "Knock-On" counts should be obtained under conditions that ensure statistical reliability, e.g., in a controlled environment (e.g., constant temperature) to obtain enough counts such that a good statistical precision (e.g., 1% error or less).

Alternative methods for independently verifying a neutron source strength include, for example, the use of a plastic scintillator with photo-multiplier-tube, a Geiger-Mueller tube, copper activation, etc. In copper activation, both isotopes of copper $^{63}$Cu and $^{65}$Cu are activated to form a number of radionuclides, including $^{58}$Co, $^{58}$Co-m, $^{60}$Co, $^{63}$Ni, $^{61}$Cu, $^{62}$Cu and $^{64}$Cu. Most of these radionuclides have half lives ranging from minutes to hours so they decay away quickly and can be conveniently monitored. The threshold for copper activation is about 10.9 MeV. Therefore, copper activation may be used for calibration of high energy neutron sources, such as a D-T Minitron™. In addition to using these means for accurate measurements of neutron source strength, the neutron source strength may also be independently corroborated by analysis of a multitude of electrical parameters of the pulsed neutron source. Note that analysis of electrical parameters may not be able to provide the desired accuracy (e.g., 1%).

Some embodiments of the invention relate to methods for providing a source strength indicator that is reliable even under typical logging conditions. Such source strength indicators may be used to compensate count rates of other detectors for environmental effects in order to derive reliable logging measurements.

According to one embodiment of the invention, the response of a neutron source/monitor detector assembly is first characterized under a variety of environmental conditions (hole size, lithology, porosity, standoff, borehole fluids, formation fluids, etc.) with an accurate and independent measurement of the neutron source strength using methods described above. This characterization produces a database that can be used to derived the $\alpha$ and $\beta$ ($N_B, N_D$) factors shown in Equation (1). Once the $\alpha$ and $\beta$ ($N_B, N_D$) factors are known, they can be used to derive the source strength indicator (S) based on the $N_B$ and $N_D$ count rates according to Equation (1). One of ordinary skill in the art would appreciate that the $\alpha$ and $\beta$ ($N_B, N_D$) factors may be derived from the database by, for example, fitting an analytical model.

In a method in accordance with the invention, the source strengths are measured both during calibration ($S_0$) and during logging (S(t)). The source strength count rates are then compared to arrive at any correction necessary for the source strength measured during logging. The count rates (x) measured by other measurement detectors (e.g., the far and near-spaced detectors or the gamma ray detectors shown in FIG. 2) can then be corrected for any source strength changes during logging. That is, the count rates measured by other detectors (x) may be corrected for neutron source variations based on the ratio of $S_0/S(t)$. Thus, the corrected count rates $y = f(S_0/S(t), x)$.

One of ordinary skill in the art would appreciate that the count rate data may be processed to remove instrumental effects and non-source-dependent count rate components before they are corrected for source changes. If these other effects are not removed, there may be second order effects which may or may not cause a noticeable degradation in the measurement.

As an example of an application of embodiments of the invention, a pulsed neutron source, neutron monitor, and gamma-ray detector are calibrated together in a water tank with the following results: $N_0$=neutron monitor count rate, and $G_0$=source-dependent gamma-ray count rate (after counting-loss correction and background subtraction).

A logging measurement is then performed and the following are obtained: $N_1$=neutron monitor count rate, and $G_1$=source-dependent gamma-ray count rate (after counting-loss correction and background subtraction). The measured gamma ray counts ($G_1$) can then be corrected for any source strength variation according to:

$$G_{1c} = \text{Corrected } G_1 = (N_0/N_1) \times G_1.$$

Advantageously, embodiments of the invention provide convenient means for monitoring neutron source strength and for correcting for any variation in neutron source strength during logging. Various factors may cause the neutron source strength to change during well logging, such as electronic and voltage changes in the tool. In addition, environmental factors may influence the effective neutron strength "seen" by the detectors. Being able to correct for neutron source strength and to compute source-compensated measurements makes it possible to derive more accurate formation properties. Furthermore, the source-compensated measurements are helpful for absolute count rate algorithms that have been shown to improve the overall measurement accuracy.

It will be apparent to those skilled in the art that this invention may be implemented using one or more suitable general-purpose computers having appropriate hardware and programmed to perform the processes of the invention. The programming may be accomplished through the use of one or more program storage devices readable by the computer processor and encoding one or more programs of instructions executable by the computer for performing the operations described above. The program storage device may take the form of, e.g., one or more floppy disks; a CD ROM or other optical disk; a magnetic tape; a read-only memory chip (ROM); and other forms of the kind well known in the art or subsequently developed. The program of instructions may be "object code," i.e., in binary form that is executable more-or-less directly by the computer; in "source code" that requires compilation or interpretation before execution; or in some intermediate form such as partially compiled code. The precise forms of the program storage device and of the encoding of instructions are immaterial here. Thus these processing means may be implemented in the surface equipment, in the tool, or shared by the two as known in the art.

Figure 5:
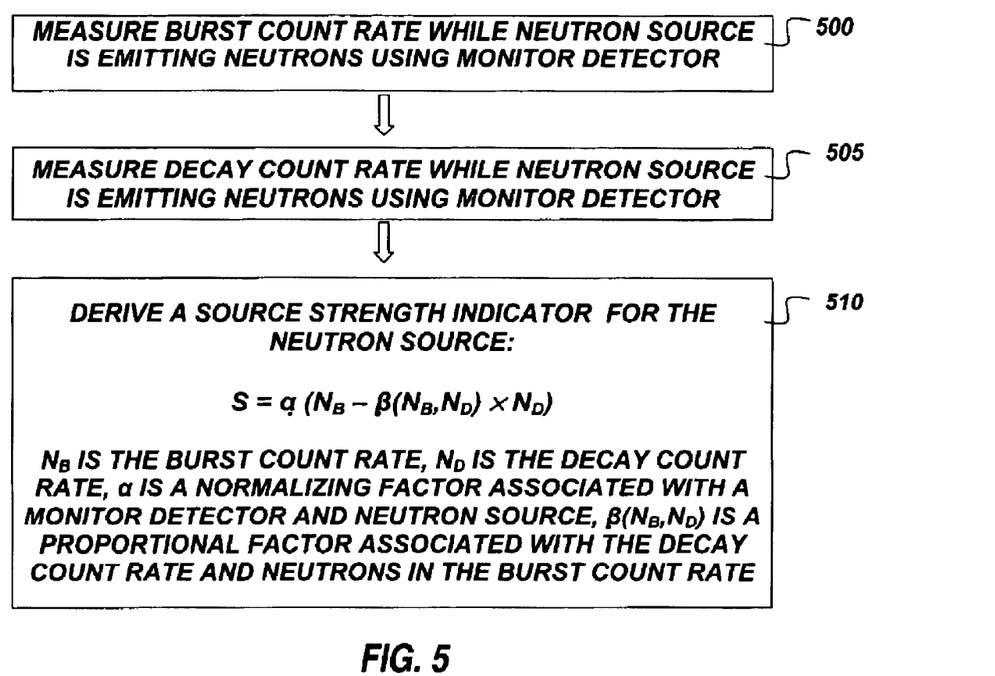
FIG. 5 shows a flow chart for a process to monitor a pulsed neutron source in accord with the invention.

FIG. 5 outlines a method for monitoring a pulsed neutron source according to an embodiment of the invention. At 500, a burst count rate is measured while the pulsed neutron source is emitting neutrons using a monitor detector disposed proximate the pulsed neutron source. At 505, a decay count rate is measured while the pulsed neutron source is not emitting neutrons using the monitor detector. Then at 510, a source strength indicator S for the pulsed neutron source is derived according to; $S = \alpha(N_B - \beta(N_B, N_D) \times N_D)$, wherein $N_B$ is the burst count rate, $N_D$ is the decay count rate, $\alpha$ is a normalizing factor associated with a monitor detector and neutron source, and $\beta(N_B, N_D)$ is a proportional factor associated with the decay count rate and neutrons in the burst count rate.

Figure 6:
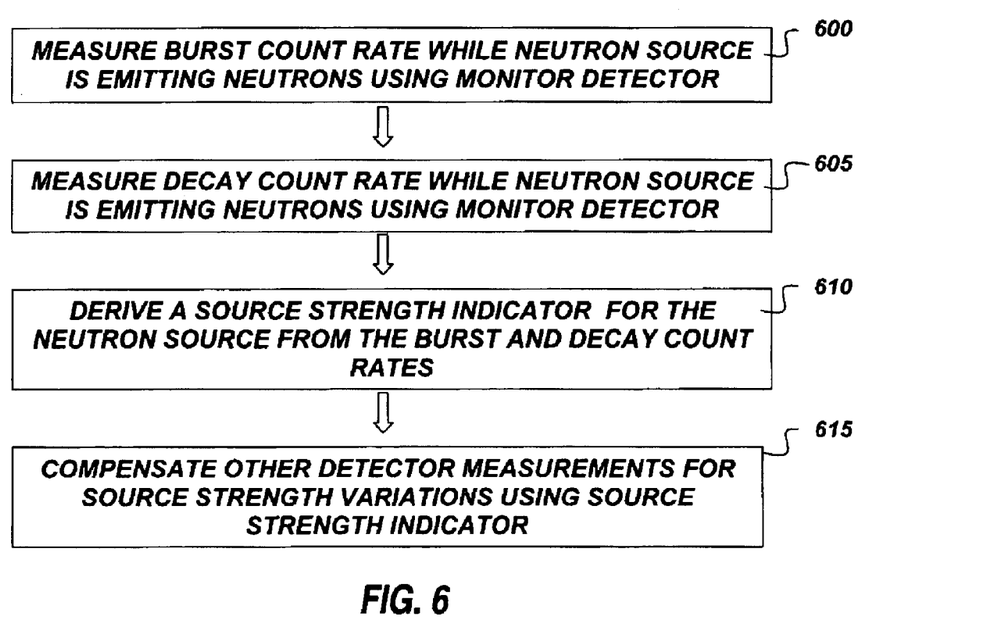
FIG. 6 shows a flow chart for a process to obtain source strength-compensated measurements using a pulsed neutron source in accord with the invention.

FIG. 6 outlines a method for obtaining source strength-compensated measurements using a pulsed neutron tool equipped with a pulsed neutron source according to an embodiment of the invention. At 600, a burst count rate is measured while the pulsed neutron source is emitting neutrons using a monitor detector disposed proximate the pulsed neutron source. At 605, a decay count rate is measured while the pulsed neutron source is not emitting neutrons using the monitor detector. At 610, a source strength indicator is derived for the pulsed neutron source from the burst count rate and the decay count rate. Then at 615, the source strength indicator is used to compensate measurements made by other detectors in the pulsed neutron tool for strength variations of the pulsed neutron source.

Figure 7:
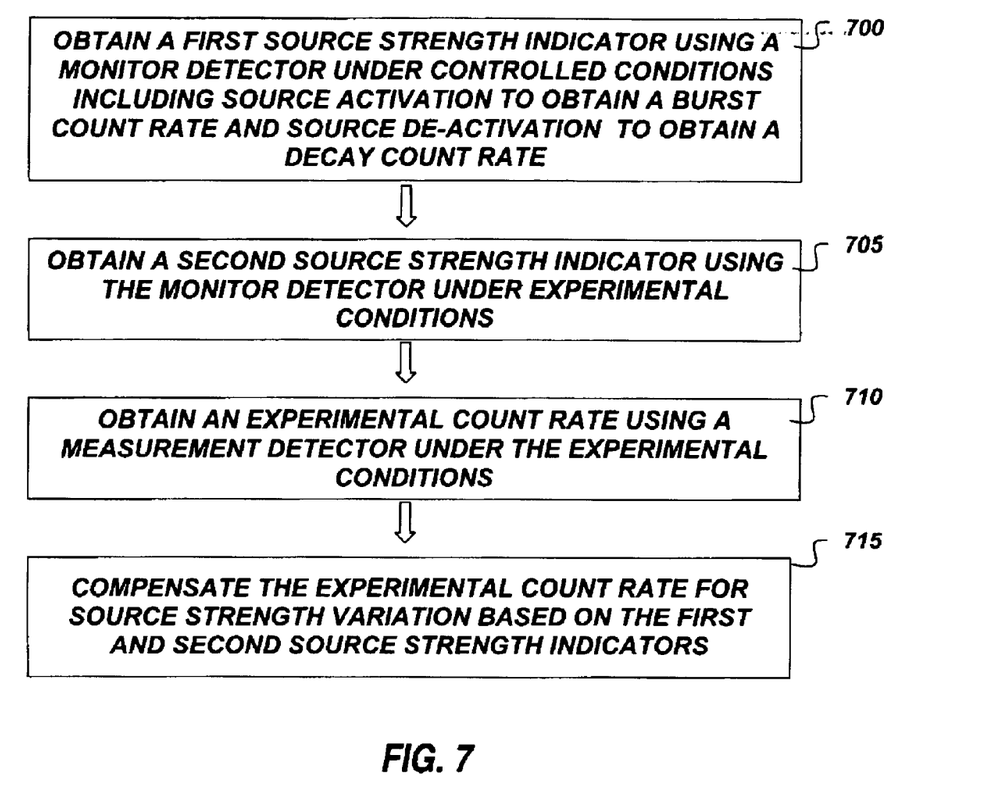
FIG. 7 shows a flow chart for another process to obtain source strength-compensated measurements using a pulsed neutron source in accord with the invention.

FIG. 7 outlines another method for obtaining source strength-compensated measurements using a pulsed neutron tool equipped with a paused neutron source according to an embodiment of the invention. At 700, a first source strength indicator is obtained using a monitor detector disposed proximate the pulsed neutron source under controlled conditions including activation of the neutron source to obtain a burst count rate and de-activation of the neutron source to obtain a decay count rate. At 705, a second source strength indicator is obtained using the monitor detector under experimental conditions. At 710, an experimental count rate is obtained using a measurement detector under the experimental conditions. Then at 715, the experimental count rate is compensated for neutron source strength variation based on the first source strength indicator and the second source strength indicator.

While the invention has been described with respect to a limited number of embodiments, those skilled in the art, having benefit of this disclosure, will appreciate that other embodiments can be devised which do not depart from the scope of the invention as disclosed herein. For example, the techniques of the invention are applicable to pulsed neutron source monitoring in applications other than subsurface logging. The invention may also be applied in wireline, coiled tubing, logging-while-tripping, or any of the other known well logging systems that include pulsed neutron sources. For the purposes of this specification it will be clearly understood that the word "comprising" means "including but not limited to", and that the word "comprises" has a corresponding meaning.

What is claimed is:

1. A method for monitoring a pulsed neutron source comprising:

measuring a burst count rate while the pulsed neutron source is emitting neutrons using a monitor detector disposed proximate the pulsed neutron source;

measuring a decay count rate while the pulsed neutron source is not emitting neutrons using the monitor detector; and deriving a source strength indicator S for the pulsed neutron source according to the following:

$$S = \alpha(N_B - \beta(N_B, N_D) \times N_D)$$

wherein $N_D$ is the burst count rate, $N_D$ is the decay count rate, $\alpha$ is a normalizing factor associated with a monitor detector and neutron source, and $\beta(N_B, N_D)$ is a proportional factor associated with the decay count rate and neutrons in the burst count rate.

2. The method of claim 1, wherein the $\alpha$ and $\beta(N_B, N_D)$ factors are computed from measurements made in a controlled environment.

3. The method of claim 2, wherein the measurements made in the controlled environment include control burst count rates when the pulsed neutron source is turned on and control decay count rates when the pulsed neutron source is turned off, while a strength of the pulsed neutron source is independently verified.

4. The method of claim 3, wherein the strength of the pulsed neutron source is independently verified by one selected from the group consisting of Knock-On measurement, copper-activation, Geiger-Mueller counting, and scintillation counting.

5. The method of claim 1, wherein the burst count rate and the decay count rate are first corrected for environmental effects before use in the deriving the source strength indicator.

6. A method for obtaining source strength-compensated measurements using a pulsed neutron tool equipped with a pulsed neutron source, comprising;
   measuring a burst count rate while the pulsed neutron source is emitting neutrons using a monitor detector disposed proximate the pulsed neutron source;
   measuring a decay count rate while the pulsed neutron source is not emitting neutrons using the monitor detector;
   deriving a source strength indicator for the pulsed neutron source from the burst count rate and the decay count rate; and
   using the source strength indicator to compensate measurements made by other detectors in the pulsed neutron tool for strength variations of the pulsed neutron source.

7. The method of claim 6, wherein the neutron source strength indicator S is derived according to the following:

$$S=\alpha(N_B-\beta(N_B,N_D)\times N_D)$$

wherein $N_B$ is the burst count rate, $N_D$ is the decay count rate, $\alpha$, is a normalizing factor associated with a monitor detector and neutron source, $\beta(N_B,N_D)$ is a proportional factor between the decay count rate and the neutrons in the burst count rate.

8. The method of claim 7, wherein the $\alpha$ and $\beta(N_B,N_D)$ factors are computed from measurements made in a controlled environment.

9. The method of claim 8, wherein the measurements made in the controlled environment include control burst count rates when the pulsed neutron source is turned on and control decay count rates when the pulsed neutron source is turned off, while a strength of the pulsed neutron source is independently verified.

10. The method of claim 9, wherein the strength of the pulsed neutron source is independently verified by one selected from the group consisting of Knock-On measurement, copper-activation, Geiger-Mueller counting, and scintillation counting.

11. The method of claim 6, wherein the burst count rate and the decay count rate are first corrected for environmental effects before use in the deriving the source strength indicator.

12. A method for obtaining source strength-compensated measurements using a pulsed neutron tool equipped with a pulsed neutron source, comprising:
   obtaining a first source strength indicator using a monitor detector disposed proximate the pulsed neutron source under controlled conditions including activation of the neutron source to obtain a burst count rate and de-activation of the neutron source to obtain a decay count rate;
   obtaining a second source strength indicator using the monitor detector under experimental conditions;
   obtaining an experimental count rate using a measurement detector under the experimental conditions; and
   compensating the experimental count rate for neutron source strength variation based on the first source strength indicator and the second source strength indicator.

13. The method of claim 12, wherein the compensating the experimental count rate involves using a ratio of the first source strength indicator and the second source strength indicator.

14. The method of claim 12, wherein each of the first source strength indicator and the second source strength indicator is derived according to the following:

$$S=\alpha(N_B-\beta(N_B,N_D)\times N_D)$$

wherein S is tie neutron source strength indicator, $N_B$ is the burst count rate, $N_D$ is tile decay count rate, q is a normalizing factor associated with a monitor detector and neutron source, $\beta(N_B,N_D)$ is a proportional factor between the decay count rate and neutrons in the burst count rate.

15. The method of claim 14, wherein the $\alpha$ and $\beta(N_B,N_D)$ factors arc computed from measurements made in a controlled environment.

16. The method of claim 15, wherein the measurements made in the controlled environment include control burst count rates obtained when the pulsed neutron source is turned on and control decay count rates obtained when the pulsed neutron source is tuned off, while a strength of the pulsed neutron source is independently verified.

17. The method of claim 16, wherein the strength of the pulsed neutron source is independently verified by one selected from the group consisting of Knock-On measurement, copper-activation, Geiger-Mueller counting, and scintillation counting.

18. A system for monitoring a pulsed neutron source disposed in a logging tool, comprising:
   a tool body adapted for subsurface disposal;
   a pulsed neutron source disposed in the tool body;
   a monitor detector disposed in the tool body proximate the pulsed neutron source;
   circuitry disposed in the tool body for controlling the pulsed neutron source;
   a processor adapted to receive burst count rate signals detected with the monitor detector when the pulsed neutron source is activated to emit neutrons;
   the processor adapted to receive decay count rate signals detected with the monitor detector when the pulsed neutron source is de-activated; and
   the processor adapted to derive a source strength indicator for the pulsed neutron source from the burst count rate signals and the decay count rate signals.

* * * * *